Figure 9:
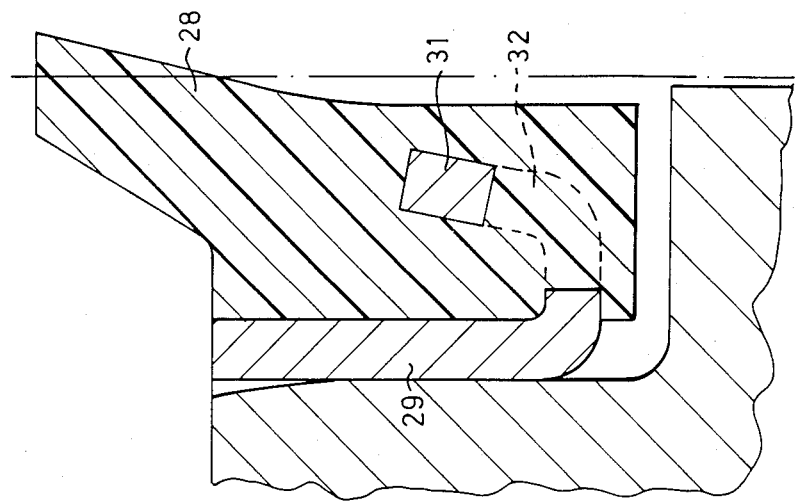

United States Patent [19]

Nilsson

[11] Patent Number: 4,618,153
[45] Date of Patent: Oct. 21, 1986

[54] ANNULAR REINFORCED WIPER FOR PISTON RODS

[75] Inventor: Rolf Nilsson, Eskilstuna, Sweden

[73] Assignee: Volvo BM AB, Eskilstuna, Sweden

[21] Appl. No.: 675,245

[22] Filed: Nov. 26, 1984

[30] Foreign Application Priority Data

Dec. 1, 1983 [SE] Sweden ............................ 8306637

[51] Int. Cl.$^4$ ........................ F16J 15/32; F16J 15/18
[52] U.S. Cl. ................................. 277/152; 277/166; 277/188 A
[58] Field of Search ............... 277/188 R, 188 A, 166, 277/152, 153

[56] References Cited

U.S. PATENT DOCUMENTS

| 4,210,339 | 7/1980 | Povejsil | 277/153 |
| 4,281,590 | 8/1981 | Weaver | 277/188 A X |

FOREIGN PATENT DOCUMENTS

| 1039325 | 9/1958 | Fed. Rep. of Germany | 277/152 |
| 1909530 | 9/1970 | Fed. Rep. of Germany | |
| 834045 | 8/1938 | France | 277/153 |
| 869366 | 11/1941 | France | 277/153 |
| 886590 | 7/1943 | France | 277/153 |
| 569821 | 6/1945 | United Kingdom | 277/153 |
| 1021864 | 3/1966 | United Kingdom | |
| 1296020 | 11/1972 | United Kingdom | 277/153 |
| 1566034 | 4/1980 | United Kingdom | |

Primary Examiner—Robert S. Ward
Attorney, Agent, or Firm—Young & Thompson

[57] ABSTRACT

An annular wiper for piston rods, disposed in a cylindrical wall opening wherein an axially movable piston rod is running, comprises a reinforced ring of an elastic, somewhat flexible material having a portion with an inner diameter slightly greater than the outer diameter of the piston rod and an axially outwardly projecting and radially inwardly projecting lip with a somewhat smaller inner diameter than the outer diameter of the piston rod. The reinforcement comprises a first annular portion surrounding the periphery of the elastic ring, creating a torque center line for the resilient ring, and a second annular portion absorbing as a compressive force the radially inwardly directed force exerted by the elastic ring as it turns around the torque center line.

9 Claims, 11 Drawing Figures

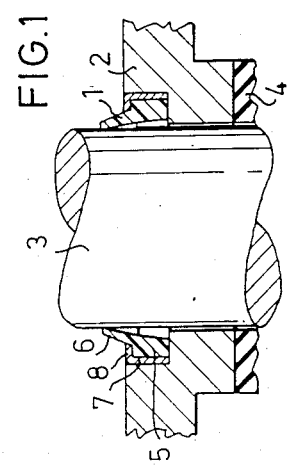
FIG.1
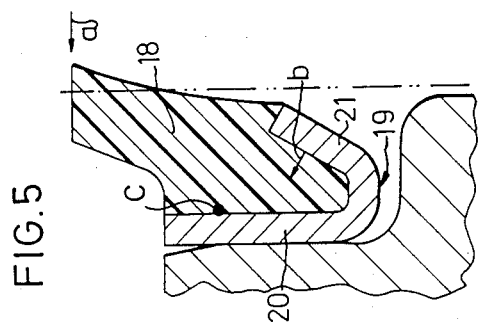
FIG.3
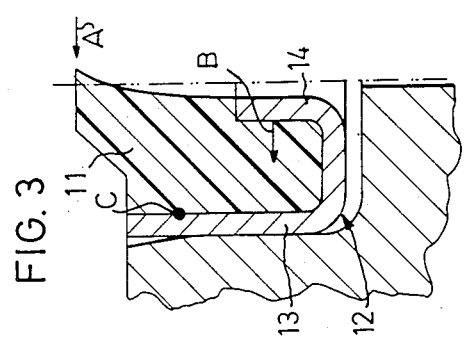
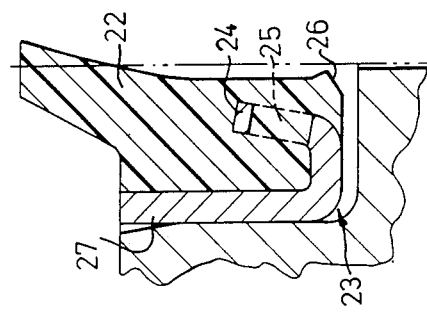
FIG.7
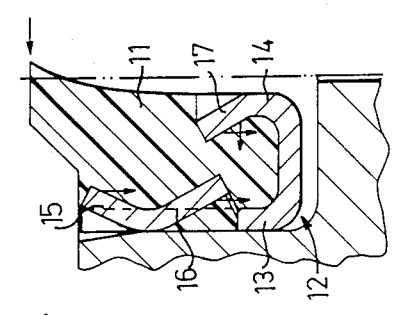
FIG.4
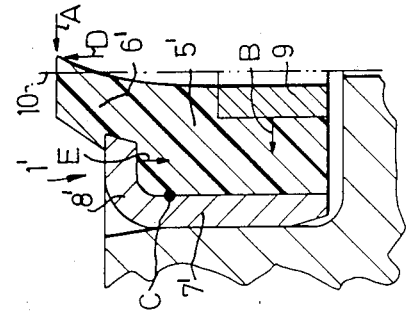
FIG.2
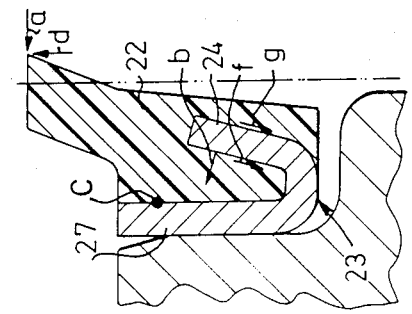
FIG.6

ANNULAR REINFORCED WIPER FOR PISTON RODS

The invention relates to a wiper for moving, cylindrical rods and relates particularly to an annular wiper for rods intended to be accommodated in a cylindrical wall opening with a cylindrical rod running therein. The wiper comprises a reinforced ring made of an elastic, resilient material with a soft but wear-resistant surface such as rubber or plastics. Preferably, this ring should be made of polyurethane since this material in particular has shown specifically useful for rod wipers due to its extreme wearability, elasticity, strength and durability, said properties together safeguarding a long lasting wiping effect. The ring includes a portion having an inner diameter which is somewhat larger than the diameter of the rod. A wiper lip projects obliquely axially outwards and radially inwards. To obtain total wiping function, the lip has an inner diameter which is slightly less than the outer diameter of the rod, and the rod is pressed through this lip.

In most cases the reinforcement consists of a non-stretchable, inelastic ring disposed around and glued or vulcanized onto the elastic ring. The reinforced ring is then pressed in the outer edge into the cylindrical opening. There is, however, the problem associated with these wipers that the gluing or vulcanization between the elastic ring and the reinforcement will loosen, resulting in reduced pressure of the lip against the rod as well as the tendency of the elastic ring to follow the rod, if it is a piston rod, axially outwardly during its movement towards that direction. These problems of the gluing or vulcanization between the elastic ring and the reinforcement loosening seems to be particularly frequent in those cases when the material of the elastic ring is polyurethane. In this way the protection against dirt and water penetrating into the mechanism that the wiper is intended for, will be partially lost. The efficiency of the wiper is an important factor since the rod sealings located further in will be rapidly worn out if dirt is allowed to penetrate into the rod sealing from the outside. Penetration of water between wiper and sealing may furthermore give rise to corrosion within this area. In order to secure that the elastic wiper ring is at least retained in place, the reinforcement ring is sometimes provided with an inwardly projecting flange intended to retain the elastic ring, even in case the gluing or vulcanization should loosen. However, the function of the gluing or vulcanization is also to provide resistance to the heeling moment which the elastic ring is exposed to as a result of the pressure from the rod on the lip. The counteracting force in this case is the tensile force in the glue or vulcanization joint, and this force can be comparatively great, which is the reason why the joint breaks. When the joint then breaks, a great deal of the thrust of the wiper edge on the rod disappears, even if the wiper still remains in place. The result is an unacceptably reduced function of the wiper. The purpose of the invention is therefore to achieve a wiper in which the elastic ring will not loosen from the reinforcement and in which the thrust of the wiper edge on the rod can be kept at a constant and effective level. This object is accomplished in that the inventive wiper has been given the characterizing features disclosed in Claim 1. Additional improvements of the wiper according to the invention are set forth in the following patent claims. By providing the wiper with a counter force acting by means of compressive instead of tensile force, there is achieved an extremely durable wiper which will be independent of the strength properties of a glue or a vulcanization.

A wiper manufactured according to the basic principles of the invention can be provided for both piston rods and for rotating rods.

Figure 8:
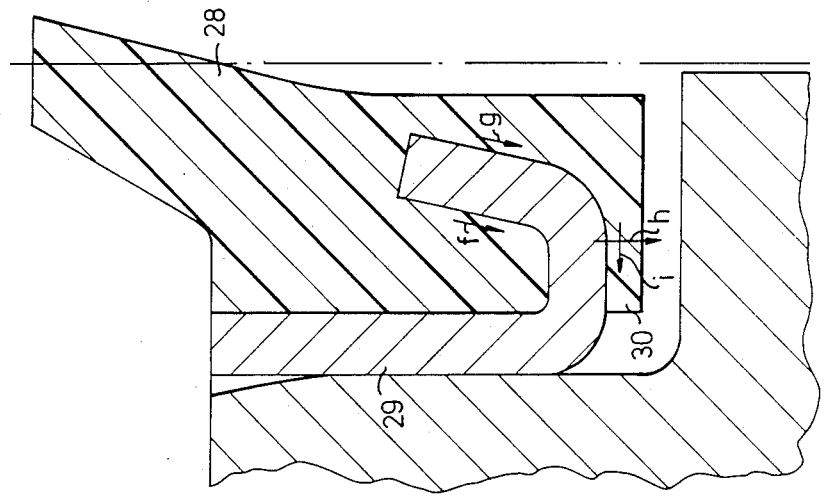
Figure 11:
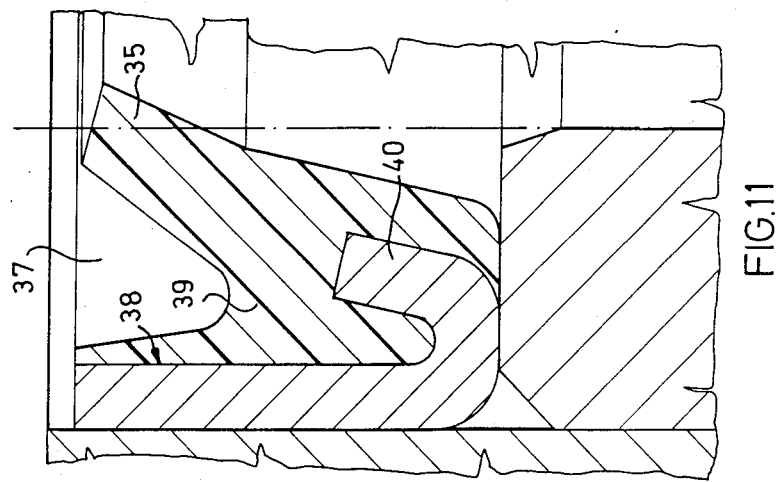
Figure 10:
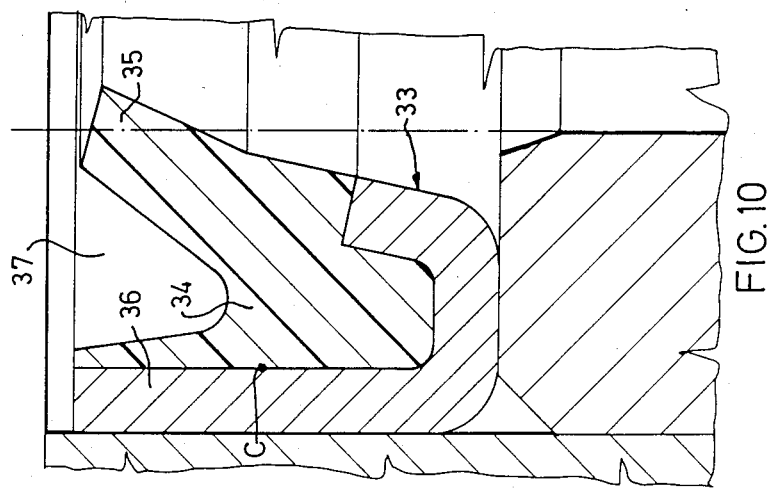

The invention will be described in more detail while referring to the accompanying drawings, in which FIG. 1 is a section through a wiper of a conventional design and placed in an opening accommodating a piston rod, FIG. 2 is a section to a larger scale through one side of a first embodiment of the wiper according to the invention preferably for a piston rod, FIG. 3 is a section through one side of a second embodiment of the wiper according to the invention preferably for a piston rod, FIG. 4 is a section corresponding to that of FIG. 3 showing various alternatives which can be performed on the second embodiment by means of different stampings and bendings, FIG. 5 is a section through one side on a third embodiment of the wiper according to the invention preferably for a piston rod, FIG. 6 is a section through one side on a fourth embodiment of the wiper according to the invention preferably for a piston rod, FIG. 7 is a section through one side on a fifth embodiment of the wiper according to the invention preferably for a piston rod, FIG. 8 is a section through one side on a sixth embodiment of the wiper according to the invention preferably for a piston rod, FIG. 9 is a section through one side on a seventh embodiment of the wiper according to the invention preferably for a piston rod, FIG. 10 is a section through one side on an eighth embodiment of the wiper according to the invention preferably for a rotating rod, and FIG. 11 is a section through one side on a ninth embodiment of the wiper according to the invention preferably for a rotating rod.

FIG. 1 illustrates a previously known wiper 1 preferably for piston rods, pressed into an opening in a wall 2 with a cylindrical piston rod 3 running therein. The wiper 1 is disposed in the mouth of the opening. A sealing 4 is disposed further down in the opening. The task of the wiper 1 is to prevent dirt and water from the outside from penetrating into the sealing. The conventional wiper shown in FIG. 1 incorporates an inner ring 5 of an elastic, somewhat extendable material with high wearing strength A suitable material for this purpose is polyurethane thanks to its extremely high wear-resistance, elasticity, strength properties and durability which together create an excellent wiping effect. Also nitrile rubber can be used which, however, does not possess quite the same degree of resistance to wear or the same good wiping effect as does polyurethane. The ring 5 has an internal portion with a somewhat larger diameter than that of the piston rod 3 allowing in this way the piston rod to freely pass this portion. A lip 6 with its wiping edge in engagement with the piston rod 3 runs obliquely outwards-inwards from this portion. The inner diameter of the lip is therefore somewhat smaller than that of the piston rod 3, so that the lip is stretched by the rod. The previously known wiper is reinforced by an exterior ring 7 having an outer, inwardly projecting flange 8. The drawback of this conventional wiper is that the gluing between the portion 5 and the portion 7 will come loose due to the glue or vulcanization joint being exposed to tensile force, which is a result of the portion 5 creating a leverage effect with a torque centre line located relatively close to the outer portion of the wiper. One object of the flange 8 is, among other things, to retain the portion 5 if and when it is separated from the ring 7.

After the joint between the portion 5 and the ring 7 has loosened, the wiper has lost a substantial part of its wiping effect since the abutment force against the rod 3 has been considerably diminished. As a matter of fact, it is necessary for a satisfactory function of a piston rod wiper that the wiper lip exerts a heavy pressure on the piston rod, and a condition therefor is that a reaction force can be achieved. In accordance with the invention there is thus arranged, in addition to an outer ring giving the torque centre line, an annular reinforcement portion for taking up as compressive force the radially inwardly directed force exerted by the inner portion, the lower portion in the figure, of the elastic ring 5.

FIG. 2 illustrates a first embodiment of the wiper according to the invention. The portions corresponding to the embodiment illustrated in FIG. 1 have been given the same reference numerals. According to this embodiment, a wiper designed in accordance with the embodiment illustrated in FIG. 1 has been provided with an inner ring 9. The wiper 1' is shown in its unloaded state, i.e. without indicating the piston rod 3. The dash-dot-dot line indicates the extension of the outer wall for the inserted piston rod 3. The drawing contains force indicating arrows A, B, D and E as well as the torque point C. Due to the annular shape of the wiper, the torque point C is in fact no point but instead a line encircling the portion 5. Because the wiper portion 5 is made of an elastic material, the above-mentioned torque point C is actually spread over a small area. When the piston rod presses against the edge of the wiper line 6, the elastic portion 5 tends to rotate around the torque point C. Its inner portion will then obtain a counteracting compressive force from the ring 9, such as the force of reaction mentioned above, and thereby the joint between the outer ring 7 and the elastic ring 5 will not be subjected to tensile force. Upon the oscillating movement of the piston rod, the lip 6 is also subjected to forces acting parallel with the piston rod and of which only the force D obtained by the outward movement of the piston rod is indicated in the figure. The inwardly directed flange 8 provides a counter-directed retaining force E in case the joint should loose and the shearing force in the joint between the portions 5 and 7 should cease to function.

FIG. 3 illustrates a second embodiment of the inventive wiper, according to which the elastic ring 11 is provided with an integrally formed ring 12 having U-shape in section and a longer outer shank 13 than the inner shank 14.

In FIG. 3, in similarity to FIG. 2, the force A radially exerted by the piston rod on the wiper lip and the counteracting compressive force B exerted by the inner portion 14 of the stiff ring 12 are indicated. The force B is obtained when the elastic portion 11 strives to turn around the torque centre line C running around it. Forces parallel with the piston rod and exerted on the lip are counteracted in this embodiment by shearing forces in the vertical glue or vulcanization joints between the portions 11 and 12, illustrated in the figure. As is known, a glue or vulcanization joint has stronger resistance to shearing forces than to tensile forces, and therefore the risk of the joint breaking under the influence of these shearing forces is relatively insignificant. In order, however, to make sure that the elastic ring 11 will not accompany the piston rod in its outward movement in case the joint should after all come loose due to ageing for example, the stiff ring 12 may be provided with stampings or bendings. FIG. 4 illustrates a few examples of suitable placements thereof. A bend 15 can be disposed in the upper end of the ring portion 13. A stamping 16 can be placed at the centre of the ring portion 13. A bend 17 can be placed in the upper end of the ring portion 14. The bends and stampings can be situated at several points around the ring. The bends may also run all the way around. One and the same stiff ring 12 can either be provided with only one type of bends and stampings described, or alternatively with a plurality thereof. The vertical arrows indicated in the figure illustrate the compressive action of the bendings on the elastic ring 11 for safeguarding a form-conditioned retention axially.

FIG. 5 illustrates a third embodiment of the wiper according to the invention. In this embodiment, the elastic ring 18 is provided with a stiff ring 19 glued or vulcanized thereon and having J-shaped cross section with a straight outer shank 20 and an inner shank 21 extending obliquely inwards from the base. As in the embodiment according to FIG. 3, the two portions 20 and 21 of the stiff ring can be provided with bends or stampings of essentially the same type as those illustrated in FIG. 4, although this has not been separately shown in any additional figure.

FIG. 6 illustrates a fourth embodiment of the wiper according to the invention, and this embodiment may be considered as the one most preferred with regard to manufacturing possibilities, cost and function. As is the case with the embodiment shown in FIG. 5, the elastic ring 22 is provided with a stiff reinforcement ring 23 having J-shaped section. In this embodiment, however, the inner, sloping ring portion 24 of the ring 23 is embedded in the ring 22 providing in this way an additional protection against the ring 22 loosening from the ring 23 due to the possibility of shearing forces in the joint acting on both sides of the ring portion 24. Moreover, the lower side as seen in the figure, of the portion 24 serves to secure a form-conditioned retention if the joint should come loose, so that the elastic ring 22 in such a case would not accompany the movement of the piston rod. An embodiment with the ring portion 24 embedded in the ring 22 without inclination would, however, also provide satisfactory security against loosening. Thus, the ring portion 24 need not be inclined.

FIG. 7 illustrates a still further embodiment of the wiper according to the invention, showing a slight resemblance with the embodiment illustrated in FIG. 6. The parts corresponding to those of FIG. 6 are given the same reference numerals. In the embodiment of FIG. 7 the fing portion 24 is provided with several through-holes 25 uniformly spaced around its annular extension. These through-holes provide cross connections in the material of the ring 22 thereby making the form-conditioned retention stronger, but the reinforcement ring in this case will be considerably more expensive to manufacture than a corresponding ring made without such holes.

FIG. 8 illustrates a sixth embodiment of the inventive device. This embodiment is similar to that shown in FIG. 6 except that the material of the elastic ring 28 is placed here also below the reinforcement ring 28 in a portion 30 preferably terminating just before the periphery of the reinforcement ring 29. Beyond the shearing forces f and g, which are identical with those shown in the embodiment of FIG. 6, the reinforcement ring also acts with a downwardly directed force h, as seen in the figure, and a shearing force between the portion 30 of the ring 28 and the lower portion in the figure of the reinforcement ring 29. Compared to the embodiment shown in FIG. 6 there is achieved in this way the advantage of obtaining an additional area for taking up shearing forces in that the elastic material has been drawn up onto the outside of the reinforcement, and also a more effective clamping.

Functionally, the embodiment illustrated in FIG. 8 is the most advantageous design but is considerably more difficult to manufacture.

FIG. 9 illustrates an alternative embodiment of that shown in FIG. 8 and is provided with a plurality of through-holes 32 in the embedded portion 31 of the reinforcement 29. With these holes a cross connection through the reinforcement is obtained thereby improving the form-conditioned retention.

All the embodiments of the wiper mentioned above are preferably intended for piston rods, and the invention was originally made in order to solve problems associated with wipers for piston rods. However, a wiper manufactured according to the basic principles of the invention is also applicable to rotating rods and gives a very good resistance against forces that may be provided on it because of possible wobbling or the like of the rod. The main difference, which is usually due, between a wiper intended for a piston rod and a wiper intended for a rotating rod, is that the lip of a wiper for a piston rod is situated outside the mouth of the mounting opening for the rod and that the lip of a wiper for a rotating rod is situated axially inside the opening a small distance from the mouth of the opening.

Two embodiments of wipers preferably intended for rotating rods are shown in FIGS. 10 and 11.

In FIG. 10, which represent an embodiment much alike the embodiment shown in FIG. 5, the stiff reinforcement ring 33 has a J-shaped section. The elastic ring 34 glued or vulcanized onto the reinforcement ring has a lip 35, which outermost part at rest, i.e. without a rod pressing the lip radially outwardly, is situated a small distance axially inside the outer end of the long part 36 of the J. A ring-formed recess 37 is provided between the lip 35 and the outer part of part 36 of the J in order to have an elastic collaring pressure to the rod while having as little friction between the rod and the wiper as possible.

In FIG. 11, which represents an embodiment much alike the embodiment shown in FIG. 6, the stiff reinforcement ring 38 has a J-formed section as in the embodiment shown in FIG. 10, but the inner shank 40 of the J is narrower such that the inner part of the reforcement ring 38 is embedded in the elastic ring 39. Other forms of wipers for rotating rods can be provided having reinforcement rings of the kinds shown for wipers intended for piston rods and a lip 35 and a recess 37 of the kind shown in FIGS. 10 and 11.

In all embodiments described, the elastic rings 5, 11, 18, 22, 34, 39 are suitably manufactured in a manner known per se by means of injection moulding, compression moulding or cast moulding directly on the reinforcement ring. A plurality of variations of the invention are conceivable.

The invention can be modified in many ways within the scope thereof. It should be noted that the wiper lip can be designed in a number of entirely different ways than what has been shown in the figures, although no other embodiments have been illustrated as they do not form part of the invention.

What I claim is:

1. Annular wiper for rods intended for accommodation in a cylindrical wall opening, said opening having a cylindrical rod running therein, and comprising a reinforced ring made of an elastic, somewhat extendable material such as plastics or rubber and having a portion with an inner diameter which is slightly greater than the outer diameter of the rod, said portion being provided with a radially inwardly projecting lip with a somewhat smaller inner diameter than the outer diameter of the rod, and the reinforcement comprising a first annular portion arranged to absorb radially outwardly directed forces caused by the outwardly compressing action on the lip created by the rod, characterized in that said first portion is stiff and is disposed to serve the purpose of providing a torque centre line for the elastic ring, and in that a second annular portion is situated radially inside of said torque centre line and is arranged to absorb as a compressive force the radially inwardly directed force exerted by the elastic ring upon its turn around said torque centre line, the space between said torque centre line and the line of application of the inwardly directed force being to its greatest extent filled with the material of the elastic ring.

2. Wiper as claimed in claim 1, characterized in that the first annular portion of the reinforcement and the second annular portion thereof are united to form an integral part.

3. Wiper as claimed in claim 1, characterized in that the inner annular portion is embedded in the material in the ring made of elastic material.

4. Wiper as claimed in claim 3, characterized in that the material in the ring of elastic material also extends along the exterior of a radially projecting portion of the reinforcement ring.

5. Wiper as claimed in claim, characterized in that the inner annular portion is provided with at least one through-hole, and preferably several through-holes distributed around its circumference 6. Wiper as claimed in claim 1, characterized in that the first annular portion of the reinforcement and the second annular portion thereof constitute separate units.

7. Wiper as claimed in claim 1, characterized in that either the first annular portion or the second annular portion of the reinforcement, or both these portions, is/are provided with a bend at its/their end facing the lip, which bend can either be made to run all the way round or have the form of bends disposed at several points along the periphery of said portion.

8. Wiper as claimed in claim 1, characterized in that the outer annular portion of the reinforcement is provided with several stampings at its centre around its circumference.

9. Wiper as claimed in claim 1, characterized in that the lip is provided essentially at the same axial level as the end of the outer part of the reinforcement ring and that an annular recess is provided between said lip and said part of the reinforcement ring.

* * * * *